US012683716B2

(12) United States Patent
Nicolini et al.

(10) Patent No.: US 12,683,716 B2
(45) Date of Patent: Jul. 14, 2026

(54) METHOD FOR PID-BASED LINK ADAPTATION FOR DYNAMIC MODULATION AND CODING SELECTION

(71) Applicant: JOHN MEZZALINGUA ASSOCIATES, LLC., Liverpool, NY (US)

(72) Inventors: Andrea Nicolini, Bologna (IT); Massimo Notargiacomo, Castel Bolognese (IT); Vincenzo Riccardo Icolari, Forli (IT)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 296 days.

(21) Appl. No.: 18/695,240

(22) PCT Filed: Oct. 17, 2023

(86) PCT No.: PCT/US2023/035272
§ 371 (c)(1),
(2) Date: Mar. 25, 2024

(87) PCT Pub. No.: WO2024/086133
PCT Pub. Date: Apr. 25, 2024

(65) Prior Publication Data
US 2025/0158750 A1     May 15, 2025

Related U.S. Application Data

(60) Provisional application No. 63/417,054, filed on Oct. 18, 2022.

(51) Int. Cl.
| | |
|---|---|
| *H04L 1/1607* | (2023.01) |
| *H04B 17/336* | (2015.01) |
| *H04L 1/00* | (2006.01) |
| *H04L 1/1812* | (2023.01) |
| *H04L 5/00* | (2006.01) |

(52) U.S. Cl.
CPC ......... *H04L 1/1671* (2013.01); *H04B 17/336* (2015.01); *H04L 1/0026* (2013.01); *H04L 1/1812* (2013.01); *H04L 5/0055* (2013.01)

(58) Field of Classification Search
CPC ... H04L 1/1671; H04L 1/0026; H04L 5/0055; H04B 17/336
USPC ......................................................... 370/329
See application file for complete search history.

(56) References Cited

U.S. PATENT DOCUMENTS

| | | | | |
|---|---|---|---|---|
| 11,128,396 | B2 * | 9/2021 | Wang .................... | H04L 1/0026 |
| 12,413,993 | B2 * | 9/2025 | Elshafie ............... | H04L 1/0036 |
| 2004/0266358 | A1 | 12/2004 | Pietraski et al. | |
| 2009/0075598 | A1 | 3/2009 | Pietraski et al. | |

(Continued)

*Primary Examiner* — Anthony Mejia
(74) *Attorney, Agent, or Firm* — BRYAN CAVE LEIGHTON PAISNER LLP

(57) ABSTRACT

A base station implements a PID (Proportional Integral Differential) control system to calculate an MCS (Modulation and Coding Scheme) in such a way that the base station responds to changes in channel conditions but does so in a stable manner and does not suffer from MCS jitter due to excessive response to spurious channel quality measurements. The method may be implemented for uplink data processing as well as downlink data processing and may be implemented by a 5G gNodeB as well as an LTE eNodeB.

20 Claims, 4 Drawing Sheets

(56) References Cited

U.S. PATENT DOCUMENTS

| 2016/0241375 A1* | 8/2016 | Lindoff ................. H04L 1/0026 |
| 2020/0112357 A1* | 4/2020 | Fakoorian ............. H04L 1/0009 |
| 2020/0287654 A1 | 9/2020 | Xi et al. |
| 2021/0037555 A1* | 2/2021 | Papasakellariou .... H04L 1/1854 |
| 2021/0226737 A1 | 7/2021 | Huang et al. |
| 2021/0351821 A1 | 11/2021 | Elshafie et al. |
| 2023/0188247 A1* | 6/2023 | Myung ................. H04L 5/0051 |
| | | 370/329 |

* cited by examiner

METHOD FOR PID-BASED LINK ADAPTATION FOR DYNAMIC MODULATION AND CODING SELECTION

CROSS-REFERENCE TO RELATED APPLICATIONS

This application is a National Stage Application of International Application No. PCT/US23/35272 filed on Oct. 17, 2023, which claims the benefit of U.S. Provisional Application No. 63/417,054, filed on Oct. 18, 2022, all of which are incorporated by reference in their entirety herein.

BACKGROUND OF THE INVENTION

Field of the Invention

The present invention relates to wireless communications, and more particularly, to a method and a device for improving link quality between a cellular base station and multiple UEs (User Equipment) while efficiently using available spectrum.

Related Art

Among the key features of the telecommunication standards 5G NR (New Radio) and LTE (Long Term Evolution, also known as 4G) is its ability to select an appropriate MCS (Modulation and Coding Scheme) for each individual UE connected to a base station. Under both standards, the base station, via its MAC (Medium Access Control) Scheduler, is able to select an appropriate MCS based on the CQI (Channel Quality Indicator) or other metrics. However, there are deficiencies in the conventional solutions: either the MCS is selected based on static information, or it is selected based on the current CQI information received by the UE. In the former case, the base station is unable to compensate for changes in channel conditions; and in the latter case, the base station may overcompensate for spurious or anomalous CQI information received by the UE, resulting in the base station erratically or sub-optimally switching MCS indices, resulting in a ripple or instability in MCS indices over time, leading to performance degradation and inefficient use of spectrum resources among connected UEs.

Accordingly, what is needed is a method by which a base station may swiftly respond to changes in channel conditions for each UEs but in such a way that prevents the base station from overreacting to spurious or anomalous CQI information.

SUMMARY OF THE DISCLOSURE

An aspect of the present disclosure involves a method for selecting a modulation and coding scheme (MCS) in a baseband unit. The method comprises receiving a transport block from a UE (User Equipment); updating a HARQ-ID data (Hybrid Acknowledge Request Identification) from the received transport block, the HARQ-ID data including a control parameter, a retransmit indicator, and decode failure indicator; computing a feedback parameter based on the decode failure indicator, computing a control offset using a PID (Proportional, Integral, Differential) implementation, wherein the control offset corresponds to the control parameter; computing an updated control parameter based on the control parameter and the control offset; and deriving a control MCS corresponding to the updated control parameter.

DESCRIPTION OF EXEMPLARY EMBODIMENTS

The disclosed system and method implement a PID feedback control system to dynamically select and set the MCS (Modulation and Coding Scheme) on both the uplink and downlink transmissions for each bearer of each UE so that the calculated BLER (Block Error Rate) for each bearer converges on a target BLER. In doing so, the system and method provides stable control and may respond rapidly to changes in channel conditions while not overreacting to spurious or anomalous CQI readings from the UE. The MCS selected by the exemplary disclosed link adaptation process is applied on a PRB (Physical Resource Block) basis over the allocated channel bandwidth reserved for data transmission, i.e., over the PUSCH (Physical Uplink Shared Channel) and PDSCH (Physical Downlink Shared Channel) in the uplink and downlink transmissions, respectively. Accordingly, the amount of data carried by each TB (Transport Block) in the PUSCH and PDSCH is determined by the selected MCS for each PRB allocation.

As used herein, the BLER may be defined as the ratio of wrongly decoded TBs and the total number of TBs sent during a given data transmission. This is consistent with how the term BLER is used in the art.

Figure 1:
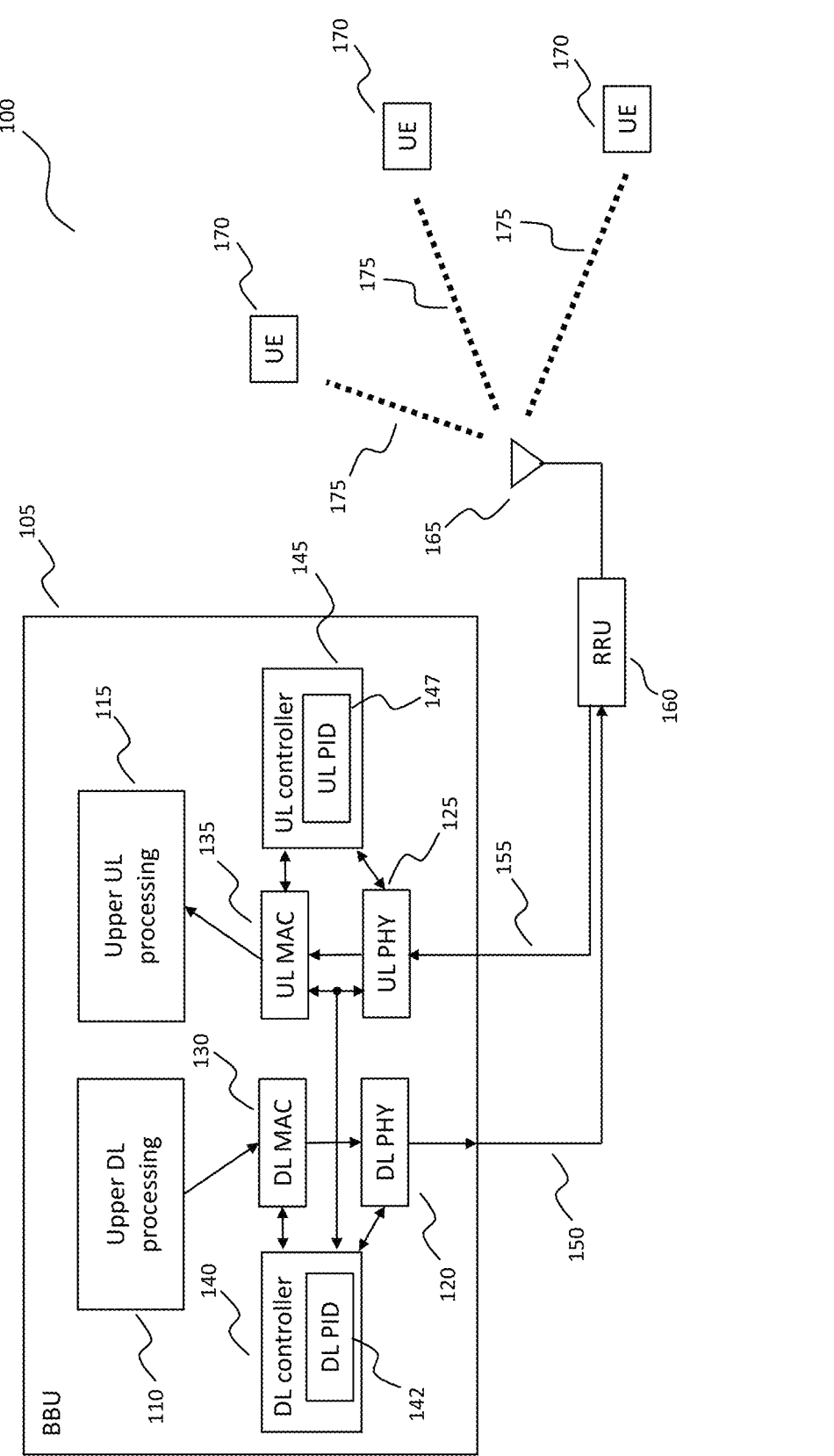
FIG. 1 illustrates an exemplary baseband processor according to the disclosure, coupled to a plurality of UEs.

FIG. 1 illustrates an exemplary system 100 for implementing a PID-based link adaption according to the disclosure. System 100 has a baseband processor 105, which may be an LTE eNodeB or a 5G gNodeB. Baseband processor 105 has a downlink PHY (Physical) layer processor 120 and an uplink PHY layer processor 125, each of which may be an implementation of the appropriate 3GPP standard. Coupled to downlink PHY layer processor 120 is a downlink MAC (Medium Access Control) processor 130; and coupled to uplink PHY layer processor 125 is an uplink MAC processor 135. Downlink MAC processor 130 and uplink MAC processor 135 may be standard-compliant implementations of the appropriate 3GPP technical specifications. Coupled to downlink MAC processor 130 is downlink upper layer processing 110, which may be standard-compliant implementations of the upper protocol stack layers defined by 3GPP and need no further elaborations for the purpose of the disclosure. Similarly, coupled to uplink MAC processor 135 is uplink upper layer processing 115, which may be standard-compliant implementations of the upper protocol stack layers defined by 3GPP and also needs no further elaborations for the purpose of the disclosure.

Exemplary BBU 105 has an exemplary DL (downlink) link adaptation controller 140 according to the disclosure. DL link adaptation controller 140 may be coupled to both DL and UL MAC processors 130 and 135, as well as DL and UP PHY processors 120 and 125. DL link adaptation controller 140 may have a DL PID (Proportional, Integral, Differential) controller 142 according to the disclosure.

Exemplary BBU 105 may also have an exemplary UL (uplink) link adaptation controller 145 according to the disclosure. UL link adaptation controller 145 may be coupled to both DL and UL MAC processors 130 and 135, as well as DL and UP PHY processors 120 and 125. UL link adaptation controller 145 may have a UL PID (Proportional, Integral, Differential) controller 147 according to the disclosure.

All of the illustrated processors within baseband processor 105, and the processes performed by the illustrated processors as described below, may be executed by one or more computer processors that execute machine readable instructions encoded within one or more non-transitory memory devices. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled. Further, if an action is described herein as being done by a referenced component (e.g., "baseband processor 105 transmits . . . ") it will be understood that this implies that a processor corresponding to the referenced component executes machine-readable instructions to perform the action.

Coupled to baseband processor 105 is a radio remote unit 160 via a fronthaul link that may have a DL fronthaul link 150 and an UL fronthaul link 155. Radio remote unit 160 may be coupled to one or more antennas 165, through which it may transmit signals to and receive signals from one or more UEs 170 over a corresponding RF link 175.

Figure 2:
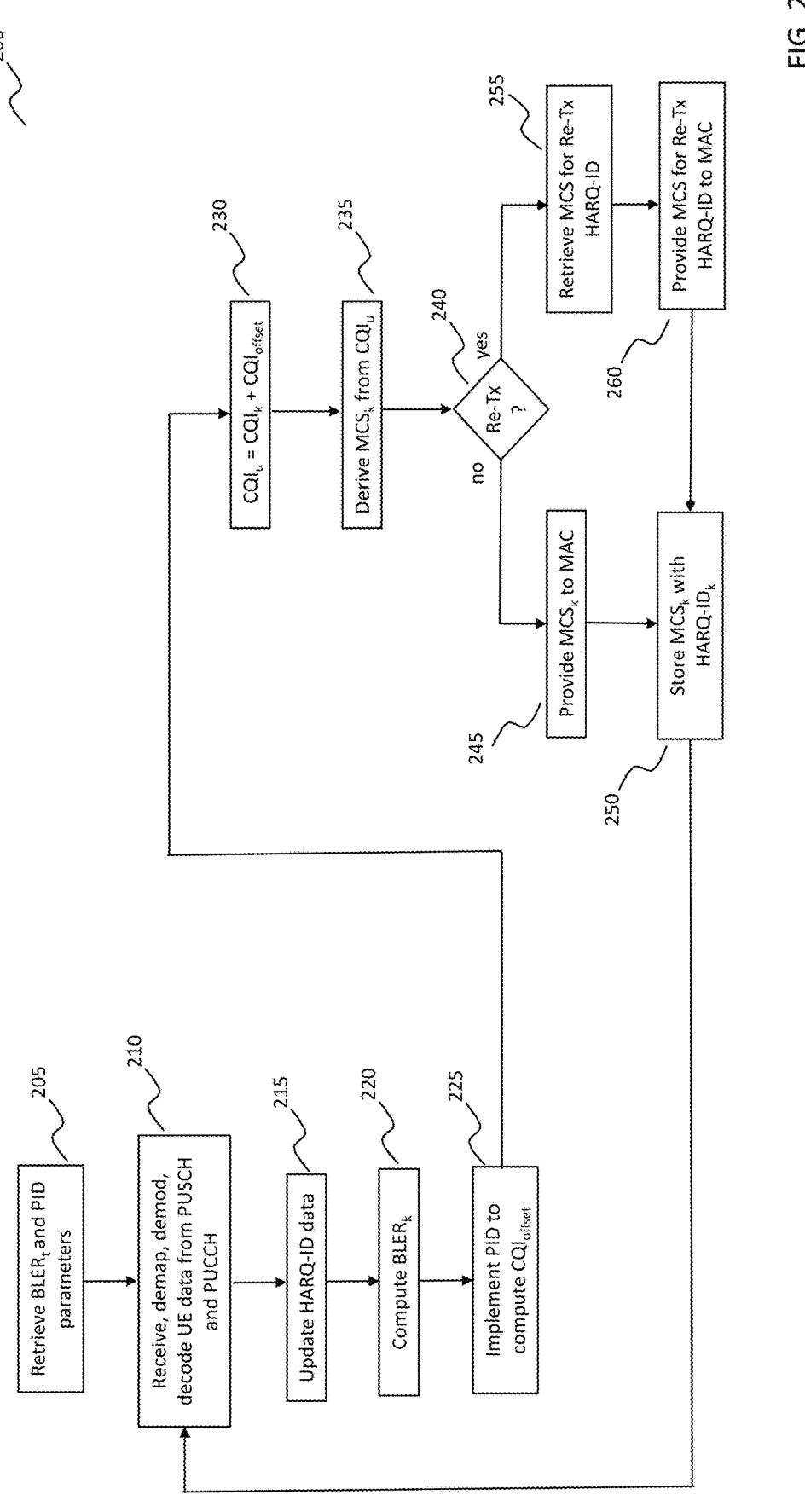
FIG. 2 illustrates an exemplary process for performing PID control of MCS selection for downlink signals from a single UE according to the disclosure.

FIG. 2 illustrates an exemplary process 200 for performing Downlink PID-based control of MCS selection according to the disclosure. Process 200 may be implemented by one or more processors running in DL link adaptation controller 140 of system 100 whereby one instantiation of process 200 is executed per DL bearer per UE 170. Accordingly, multiple instantiations of process 200 may be executing simultaneously for a given UE 170, each handling different communications and each having a different quality of service requirement (or BLER target). The description of process 200 covers a single bearer for a single UE 170. Further, process 200 may apply to, and be implemented within, either a 5G gNodeB or an LTE eNodeB, with minor differences in implementation that are discussed below.

In step 205, DL controller 140 retrieves parameters used in processing, which may include a target Block Error Rate (BLER$_{target}$); a PID proportional constant $K_p$; a time integral constant $T_i$; a time derivative constant $T_d$; and an integration time window length. DL link adaptation controller 140 may store these parameters in a local memory. Some of this information may be configurable via a user interface, and/or some of the information may be provided by via a core network (not shown) coupled to the BBU 105, whereby a network operator may provide QoS requirements for BBU 105 for each bearer of each UE 170.

In step 210, UL PHY processor 125 receives an uplink signal from a UE 170 via radio remote unit 160 over uplink fronthaul link 155 in the form of PUSCH (Physical Uplink Shared Channel) data and PUCCH (Physical Uplink Control Channel) data, in accordance with processes specified by the 3GPP (3$^{rd}$ Generation Partnership Project). In doing so, UL PHY processor 125 demaps, demodulates, and decodes the individual transport blocks corresponding to a given bearer of a UE 170 connected to baseband processor 105.

In step 215, DL link adaptation processor 140 retrieves data from UL PHY processor 125 and UL MAC processor 135. The retrieved data pertains to the quality of signal reception from the corresponding bearer. HARQ-ID (Hybrid Automatic Repeat Request ID); ACK/NACK (Acknowledgement/Negative Acknowledgement) which may be referred to herein below as a decode failure indicator; and CQI (Channel Quality Indicator) which may be relate to a control parameter. The ACK/NACK information here corresponds to the current transport block. With this information, DL link adaptation processor 140 populates current HARQ-ID information for time iteration k. As used herein, k refers to the current iteration of process 200 and k−1 refers to the previous iteration. Accordingly, the results of step 215 are buffered data for HARQ-ID$_k$, CQI$_k$, C$_k$ (a bit indicating whether a NACK indication was received, indicating the need for baseband processor 105 to repeat the previous transmission of the transport block corresponding to HARQ-ID$_k$).

In step 220, DL link adaptation processor 140 calculates the current BLER$_k$, which may be referred to herein below as a feedback parameter. It may calculate this variable according to the following relation:

$$BLER_k = \frac{1}{\overline{k}}\sum_{j=k-\overline{k}}^{k} C_j = \frac{(\overline{k}-1)BLER_{k-1} + C_k}{\overline{k}}$$

Where C$_k$ is the current transfer block error detection bit obtained from the ACK/NACK information obtained in step 215. The integration of BLER$_k$ runs over an integration time window length k that is configurable and retrieved in step 205. In an exemplary embodiment, the window length may be the equivalent of 1 second of integration, or 1000 iterations. The length of the moving window may be selected and configured whereby a shorter time window may make system 100 more responsive to change in channel conditions, but may also be susceptible to instabilities and spurious changes in received CQI values, etc. On the other hand, a longer time window may lead to more stable operation of system 100, but less sensitive to changes in channel conditions. Once computed, the value for BLER$_k$ is stored by DL link adaptation controller 140 for later use in process 200.

In step 225, the DL PID controller 142 within DL link adaptation processor 140 implements a PID (Proportional-Integral-Derivative) control algorithm to compute a control offset to the current CQI$_k$ value to improve both stability and response to changes in channel conditions according to the disclosure.

$$u_{p,k} = K_p\, e_k = K_p\, (BLER_t - BLER_k)$$

$$u_{d,k} = \frac{T_d}{T_d + N}\, u_{d,k-1} + \frac{K_d N}{T_d + N}\, (e_k - e_{k-1})$$

$$u_{pd,k} = u_{p,k} + u_{d,k}$$

$$u_{i,k} = K_i \frac{(e_k + e_{k-1})}{2}$$

$$u_{i,k-1} \simeq u_{aw,k} = u_{k-1}^{SAT} - u_{pd,k-1}^{SAT}$$

$$u_k = u_{i,k} + u_{pd,k}^{SAT} + u_{aw,k}$$

Where:

$u_k$ current control action;

$u_{k-1}$ previous control action;

$u_{p,k}$ proportional term;

$u_{i,k}$ integral term;

$u_{d,k}$ derivative term;

$u_{pd,k}$ proportional-derivative tens;

$u_{aw,k}$ Anti-Windup (AW) term;

$K_p$ proportional constant;

$T_i$ time integral constant;

$T_d$ time derivative constant;

$K_i = K_p/T_i$ integral constant;

$K_d = K_p T_d$ derivative Constant.

The superscript SAT means that the involved action has been bounded by a lower and upper bound that has been pre-configured and retrieved in step 205.

The PID computation of step 225 may alternatively be expressed as follows:

$$u_k = u_{p,k} + u_{i,k} + u_{d,k} =$$

$$= K_p e_k + K_i \sum_{j=0}^{k} e_j + K_d (e_k - e_{k-1})$$

Where $e_k = \text{BLER}_{target} - \text{BLER}_k$ and $e_{k-1} = \text{BLER}_{target} - \text{BLER}_{k-1}$.

And given a 1 second time window of integration, the integral sum will for 1000 iterations.

For process 200, the current control action $u_k$ is the computed $\text{CQI}_{offset}$ that is used for the PID control of the MCS, and it is the result of the kth execution of step 225. As mentioned above, $u_{k-1}$ is the computed $\text{CQI}_{offset}$ of the execution of step 225 in the previous iteration of process 200. The parameters $\text{BLER}_{target}$ and proportional constant $K_p$ are preconfigured and retrieved by DL link adaptation controller 140 in step 205.

Figure 4:
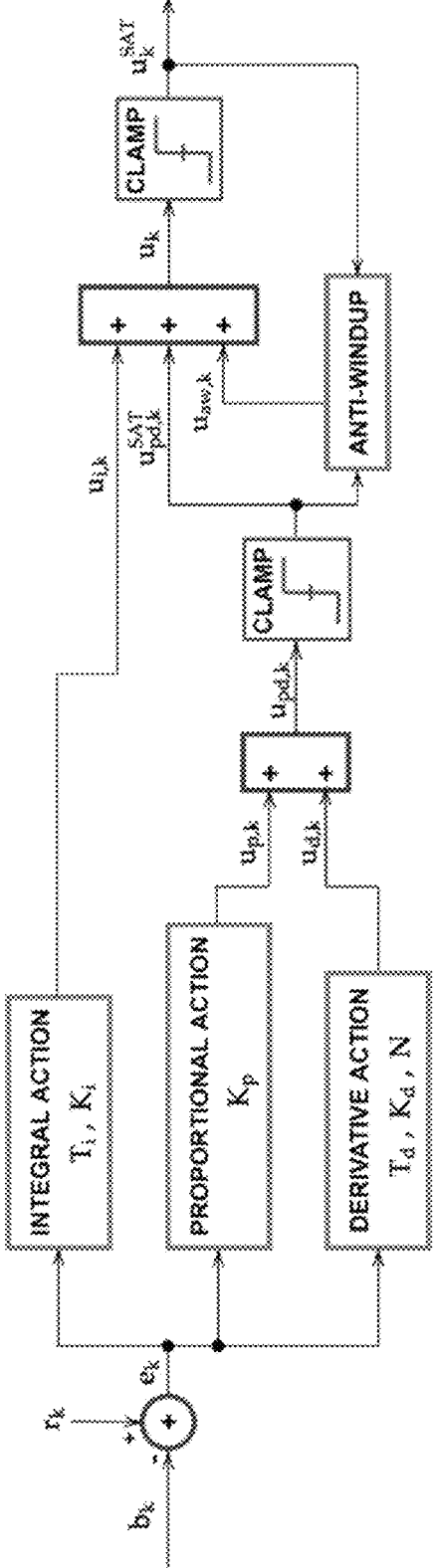
FIG. 4 illustrates an exemplary implementation of the PID computation according to the disclosure.

FIG. 4 illustrates an exemplary implementation of the PID computation performed in step 225. An advantage of using a PID controller is that at every retransmission control action $u_k$ may diminish (i.e., the MCS settles) with the aim of quickly improving signal quality with the appropriate signal demodulation. In doing so, process 200 may prevent excessive ripple in the MCS index. It has been observed that the controlled MCS index settles faster to a lower state than it does to a higher one. In other words, the time required to reach a higher appropriate MCS is longer than the time required to reach a lower appropriate MCS.

As shown above, the control action $u_k$ is a function of the difference between the desired $\text{BLER}_{target}$ and the current estimated $\text{BLER}_k$ but enhanced with integral control action $u_{i,k}$ and differential control action $u_{d,k}$ in accordance with PID control. The greater the error, the greater the correction on the system. In other words, the greater are the error $e_k$ and the proportional constant $K_p$, the faster is the system reaction to changes, but may contribute to destabilization.

Regarding integral control action, the lower the time integral constant $T_i$, the higher the risk to destabilize the system, but the more quickly the steady state error goes toward zero. In an exemplary embodiment, $T_i$ may be calculated by DL PID controller 142 according to a trapezoidal (i.e., Tustin) approximation, where the height of the trapezoid is given by the integral constant K; and the two bases by the current and previous control errors, respectively. This term provides a weighted mean of $e_k$ and $e_{k-1}$, thus provides a form of "long-term" memory (i.e., BLER bias) to the system.

Regarding derivative control action, depending on the configured value of time derivative control constant $T_d$ the greater the variation (i.e. derivate) over the error, the greater the correction imposed by DL PID controller 142. In other words, the system can "brake" faster when estimated $\text{BLER}_k$ diverges excessively from $\text{BLER}_{target}$. In this way the system stability is improved. However, an improperly set derivative control constant $T_d$ can cause wide ripple around the target value, which could lead to a loss of performance. Moreover, since it is impossible to realize a pure "anticipative" derivative action, DL PID controller 142 may impose a low-pass filter on derivative control constant $T_d$ with time constant $T_d/N$ (i.e., cut-off frequency equal to $N/T_d$). In a discrete-time representation, this behavior may be interpreted as an average over N samples.

Table I provides an overview of the effect of different ranges of control constants $T_i$, $T_d$, and $K_p$.

TABLE I

| PID Constant | Stability | $e_\infty$ | $T_a$ | $T_r$ | S |
|---|---|---|---|---|---|
| $K_p$ Increase | Degrade | Decrease | Small Increase | Decrease | Increase |
| $K_i$ Increase* | Degrade | Eliminate | Increase | Small Decrease | Increase |
| $K_d$ Increase** | Improve | Minor Change | Decrease | Small Decrease | Decrease |

Where $e_\infty$ is a steady state error (i.e., control error for $k \to \infty$); $T_a$ is the adjustment (i.e. convergence, settling) time; $T_r$ is the rise time; and S is the maximum overshoot.

An optimal PID tuning leads to a steady state error and an overshoot that is almost null, together with a fast convergence to the $\text{BLER}_{target}$ and strong stability. In an exemplary embodiment, the UL and DL communication between BBU 105 and UEs 170, involves throughput and spectral efficiency as important performance metrics. Thus, the PID algorithm implemented by DL PID controller 142 must be able to provide all the aforementioned properties and ensure proper throughput and spectral efficiency. This depends on proper tuning of the PID via selection of control constants $T_d$, $T_i$, and $K_p$. The control constants may be entered into a memory (not shown) within DL link adaptation controller 140 via a user interface (not shown). Alternatively, in an exemplary embodiment, the control constants may be automatically refined according to intelligent control algorithms that are known to the control field. It will be understood that such variations are possible and within the scope of the disclosure.

As mentioned above, the result of step 225 is a value for the current control action $u_k$, which in the DL is the $\text{CQI}_{offset}$. Depending on the PID terms $u_{p,k}$, $u_{i,k}$, and $u_{d,k}$, the sign of current control action $u_k$ may be either positive or negative. If current control action $u_k$ is negative, then generally the block error rate measured across the configured integrated time window is greater than the target error block rate, and the channel conditions of the given RF link 175 for the given bearer between BBU 105 and given UE 170 have gotten worse. In this case, given the negative control action $u_k$ (also referred to herein as a control offset $u_k$) indicates that the previous $\text{MCS}_{k-1}$ may be too aggressive and needs to be changed in response to the worsening channel conditions. In response, DL link adaptation controller 140 may decrease the index for $\text{MCS}_k$ to make the channel more robust, using processes described below. However, if current control action $u_k$ is positive, then generally the block error rate measured across the configured integrated time window is less than the target error block rate, and the channel conditions of the given RF link 175 for the given bearer between BBU 105 and given UE 170 have improved. In this case, given the positive control offset $u_k$ indicates that the previous $MCS_{k-1}$ may be too conservative and needs to be changed to take advantage of improved channel conditions. In response, DL link adaptation controller 140 may increase the index for $MCS_k$ using processes described below and provide for more efficient use of spectrum.

In step 230, DL link adaptation controller 140 calculates $CQI_u$, which is the sum of $CQI_{offset}$ computed in step 225 and $CQI_k$ received in step 210. Accordingly, the PID adjusted $CQI_u$ is the $CQI_k$ received from UE 170 with the control offset $CQI_{offset}$.

In step 235, DL link adaptation controller 140 derives the proper $MCS_k$ based on the computed CQI. In doing so, it may apply the computed $CQI_u$ to one or more look up tables or functions stored in a local memory that maps the CQI value to a corresponding MCS.

The specific internal functions of step 235 depend on whether BBU 105 is an LTE eNodeB or a 5G gNodeB.

In the case that BBU 105 is an LTE eNodeB, DL link adaptation controller 140 may map $CQI_u$ to MCS as follows: (1), it maps $CQI_u$ to SE (Spectral Efficiency) according to tables 7.2.3-1 to 7.2.3-6 of 3GPP TS 36.213; and then maps SE to TBS (Transport Block Size) according to a function that may be based on the same tables, whereby any value of SE corresponds also to a modulation order and a code rate. Since the latter is defined as the ratio between the TBS and the total number of physical layer bits per subframe that are available to transmit that transport block, it will be understood how to derive a function that maps $SE_k$ to $MCS_k$.

In the case that BBU 105 is a 5G gNodeB, DL link adaptation controller 140 may take a different approach. In the case of 5G. DL link adaptation controller 140 may map $CQI_u$ to SE according to tables 5.2.2.1-2 to 5.2.2.1-4 of TS 38.214. Then DL link adaptation controller 140 may map SE to $MCS_k$ according to tables 5.1.3.1-1 to 5.1.3.1-3 of TS 38.214.

Variations to the approaches of step 235 are possible. For example, instead of performing a two step look-up-table mapping, DL link adaptation controller 140 may execute this mapping with a single mathematical function or a single derived look-up-table that incorporates the two table mapping described above. It will be understood that such variations are possible and within the scope of the disclosure.

In step 240, DL link adaptation controller 140 determines whether the $HARQ-ID_k$ data updated in step 215 indicates that the current transport block is a retransmission of an earlier decode failure. In doing so, DL link adaptation controller 140 may derive this information from the ACK/NACK information received in step 215, such as the current transfer block error detection bit $C_k$ used in the calculation of $BLER_k$ in step 220. If the current $HARQ-ID_k$ data is associated with a retransmission, process 200 proceeds to step 255, in which DL link adaptation processor 140 retrieves the previous MCS for this $HARQ-ID_k$ corresponding to the transport block whose decode failed.

In step 260, DL link adaptation processor 140 provides the MCS retrieved in step 255 to DL MAC processor 130 and/or DL PHY processor 120. This is done regardless of the computation of $MCS_k$ because for retransmission, the MCS used in the previous transmission must be used for the retransmission.

In a variation, DL link adaptation controller 140 may transmit the calculated $MCS_k$ even in the case of a retransmission. However, if this is done, the amount of data to be transmitted must be the same as the data subject to retransmission.

Returning to step 240, if DL link adaptation controller 140 determines that the current transport block is not associated with a retransmission, then process 200 proceeds to step 245, whereby DL link adaptation processor 140 provides the $MCS_k$ computed in step 235 to DL MAC processor 130.

In step 250, regardless of the logic path taken from step 240, DL link adaptation processor 140 stores the $MCS_k$ computed in step 235 in local memory, and stores with it the corresponding $HARQ-ID_k$. This is done so that in the event of a retransmission (or another retransmission), the MCS for the given HARQ-ID is preserved in the event of a future decode failure and subsequent retransmission request in a future iteration of process 200.

With step 250 complete, process 200 returns to step 210 and DL link adaptation controller 140 receives the next transport block for its assigned bearer.

As mentioned above, DL link adaptation controller 140 may run multiple simultaneous instantiations of process 200, one per bearer for each UE 170, and for potentially many UEs 170. A given UE 170 may have multiple bearers, each with a different QoS (Quality of Service) requirements and accordingly a distinct $BLER_{target}$. For example, a given UE may have one bearer carrying web browser data that may have a $BLER_{target}$ of 10%. And may have another bearer carrying data from an app that may have a $BLER_{target}$ of 1%.

Figure 3:
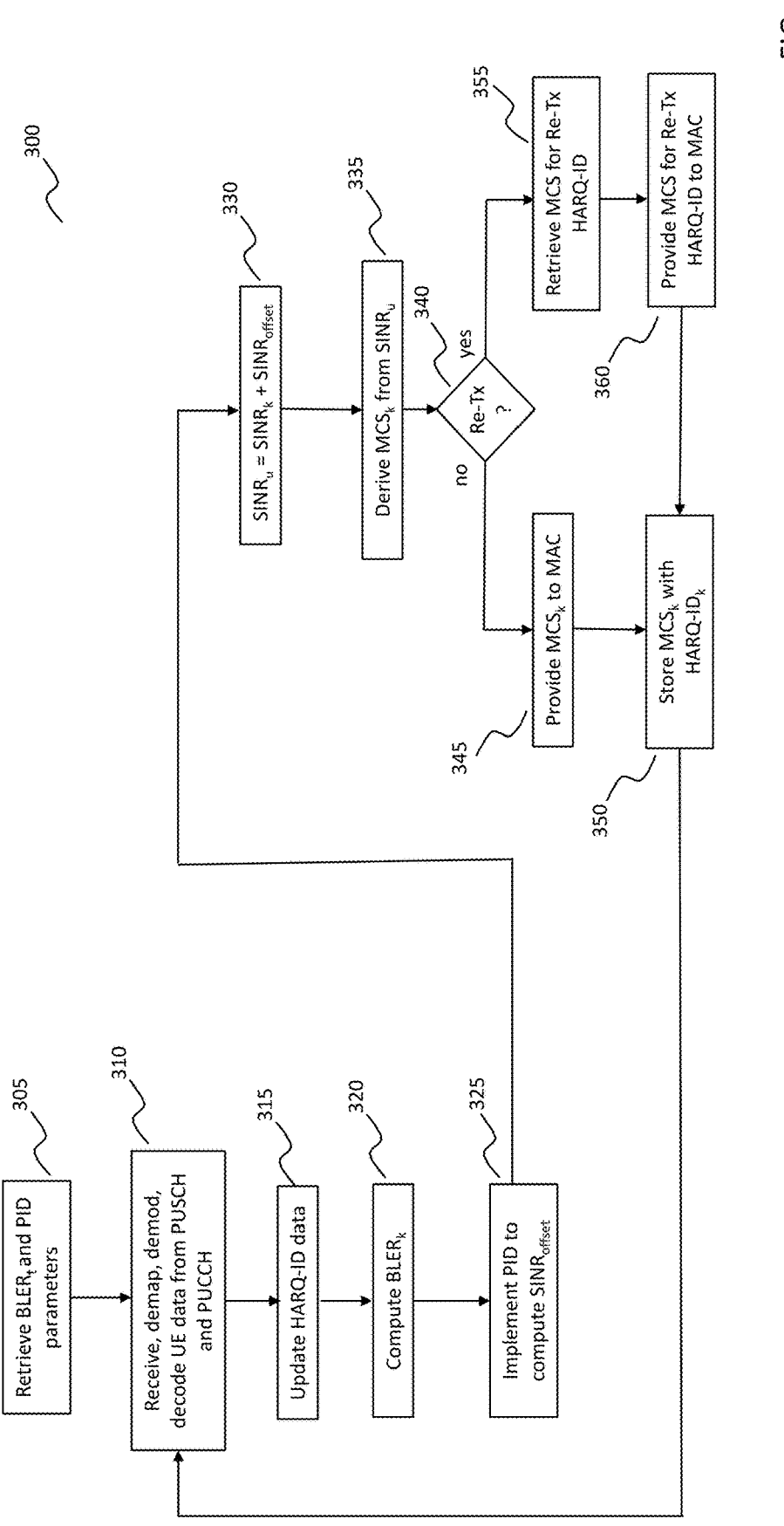
FIG. 3 illustrates an exemplary process for performing PID control of MCS selection for uplink signals to a single UE according to the disclosure.

FIG. 3 illustrates an exemplary process 300 for performing Uplink PID-based control of MCS selectin according to the disclosure. Process 300 may be implemented by one or more processors running in UL link adaptation controller 145 whereby one instantiation of process 300 corresponds to a single UL bearer of a given UE 170.

A primary difference between DL process 200 and UL process 300 is that DL process 200 is for controlling the selection of a stable $MCS_k$ for transmission from BBU 105 to a given UE 170 via radio remote unit 160; and UL process 300 is for controlling the selection of a stable $MCS_k$ to be relayed to the target UE 170 so that the UE 170 may use the selected $MCS_k$ for transmission from US 170 to BBU 105 via radio remote unit 160.

In step 305, UL link adaptation controller 145 retrieves parameters used in processing, which may include $BLER_{target}$; a PID proportional constant $K_p$; a time integral constant $T_i$; time derivative constant $T_d$; and an integration time window length. UL link adaptation controller 145 may store these parameters in a local memory. Step 305 may be identical to step 205 in terms of functions performed. However, the PID control parameters for UL may be completely different from those for DL. One reason for this is that the control variable is different: SINR (Signal to Interference plus Noise Ratio) vs. CQI.

In step 310, UL PHY processor 125 receives an uplink signal from a target UE 170 via radio remote unit 160 over uplink fronthaul link 155 in the form of PUSCH (Physical Uplink Shared Channel) data and PUCCH (Physical Uplink Control Channel) data, in accordance with processes specified by the 3GPP (3rd Generation Partnership Project). In doing so, UL PHY processor 125 demaps, demodulates, and decodes the individual transport blocks corresponding to each UE 170 connected to baseband processor 105. This may be identical to what is performed in step 210 above.

In step 315, UL link adaptation processor 145 retrieves HARQ-ID data from UL PHY processor 125 and UL MAC Processor 135 along with information pertaining to the quality of signal reception from the corresponding bearer. This includes calculating the SINR$_k$ for the received transport block as part of 3GPP-defined processes for performing channel estimation based on DMRS (Demodulation Reference Signals) and other signals that UE 170 inserts into its transmitted signal (i.e., PUSCH) in order to facilitate channel estimation for coherent demodulation and measurements. SINR$_k$ may be calculated using known techniques. With this information, UL link adaptation processor 145 populates current HARQ-ID information for time iteration k. Accordingly, the results of step 315 are buffered data for HARQ-ID$_k$, SINR$_k$, and C$_k$ (a bit indicating whether BBU 105 experienced a CRC failure in processing the UL transport block processed in step 210).

In step 320, UL link adaptation controller 145 computes BLER$_k$. UL link adaptation controller 145 may compute BLER$_k$ using the same mathematical relation as that described for step 220 of process 200 above. However, whereas in step 320 (DL), the term C$_k$ is the current transfer block error detection bit, which is determined directly by BBU 105 when performing the CRC (Cyclic Redundancy Check) on the incoming PUSCH. If the CRC calculated from the received PUSCH data is equal to the one really appended to that data by UE 170, no decoding errors occur and C$k$=0, otherwise C&=1.

In step 325, The UL PID controller 147 in UL link adaptation controller 145 implements a PID control algorithm to compute a control offset SINR$_{offset}$, to the current SINR$_k$ to improve both stability and response to changes in channel conditions according to the same relation and parameters as that described above regarding step 225.

For process 300 the current control action u$_k$ (also referred to as control offset u$_k$) is a computed SINR$_{offset}$ that is used for the PID control of the MCS for the UL transmissions over the bearer for a given UE 170. Control action SINR$_{offset}$ is the result of the kth execution of step 325. As mentioned above, u$_{k-1}$ is the computed SINR$_{offset}$ of the execution of step 325 in the previous iteration of process 300. The parameters BLER$_{target}$, and PID constants K$_p$, T$_i$, T$_d$ are preconfigured and retrieved by UL link adaptation controller 145 in step 305. The execution of the PID algorithm—with the exception of the specific parameters and inputs—may be the same as that described in relation to step 225 of process 200.

In step 330, UL link adaptation controller 145 calculates SINR. In the case that BBU 105 is a 5G gNodeB, UL link adaptation controller 145 calculates SINR$_u$ the same was as described above with regard to step 230. Otherwise, if BBU 105 is an LTE eNodeB, then UL link adaptation controller 145 may compute SINR$_u$ the same was as shown for step 230 but with an additional value StaticOffset, which may be equal to the value 2.25 plus the dB conversion of the number of receive antennas (or layers) associated with radio remote unit 160.

In step 335, UL link adaptation controller 145 derives the proper MCS$_k$ based on the computed SINR$_u$. In doing so, it may apply the computed SINR$_u$ to one or more look up tables or functions stored in a local memory that maps the SINR value to a corresponding MCS.

The specific internal functions of step 335 depend on whether BBU 105 is an LTE eNodeB or a 5G gNodeB.

In the case that BBU 105 is an LTE eNodeB, UL link adaptation controller 145 may set a TBS$_{index}$ parameter that is equal to the SINR$_u$ computed in step 330 and then map the TBS$_{index}$ to derive MCS$_k$ according to tables 8.6.1-2, 8.6.1-2A, and 8.6.1-3 of 3GPP TS 36.213.

In the case that BBU 105 is a 5G gNodeB, UL link adaptation controller 145 may take a different approach. In this case, it may map SINR$_u$ to MCS$_k$ using two steps. The first step is to compute the spectral efficiency using the theoretical limit fixed by the Shannon-Hartley channel capacity theorem:

$$SE \leq \log_2\left(1 + 10^{\frac{SINR_{db}}{10}}\right)$$

The second step is to map SE to MCS$_k$ according to tables 6.1.4.1-1 and 6.1.4.1-2 of 3GPP TS 38.214.

In step 340, UL link adaptation controller 145 determines whether the received transport block corresponds to a retransmission. If it is, then process 300 proceeds to step 355, whereby UL link adaptation controller 145 retrieves the MCS corresponding to the previous transmission of this HARQ-ID, due to the fact that the MCS does not change in retransmission. And in step 370, UL link adaptation controller 145 provides this MCS (associated with the retransmission) to UL MAC processor 135 for transmission to the UE 170 via the next PDCCH (Physical Downlink Control Channel).

Returning to step 340, if the current transport block is not a retransmission, then process 300 proceeds to step 255, whereby UL link adaptation controller 145 provides the MCS$_k$ derived in step 345 to UL MAC processor 135 for transmission to the UE 170 via the next PDCCH (Physical Downlink Control Channel).

In a variation, UL link adaptation controller 145 may transmit the calculated MCS$_k$ even in the case of a retransmission. However, if this is done, the amount of data to be transmitted must be the same as the data subject to retransmission.

In step 350, UL link adaptation controller 145 stores the calculated MCS$_k$ with its corresponding HARQ-ID$_k$. Then process 300 returns to step 305 to receive the next transport block for the assigned bearer of the given UE 170.

What is claimed is:

1. A method for selecting a modulation and coding scheme (MCS) in a baseband unit, comprising:
   receiving a transport block from a UE (User Equipment);
   updating a HARQ-ID data (Hybrid Acknowledge Request Identification) from the received transport block, the HARQ-ID data including a control parameter related to channel quality, a retransmit indicator, and decode failure indicator;
   performing a PID (Proportional, Integral, Differential)-based computation of a control offset, wherein the control offset corresponds to the control parameter;
   computing an updated control parameter based on the control parameter and the control offset; and
   deriving a control MCS corresponding to the updated control parameter.

2. The method of claim 1, further comprising:
   providing a previous MCS corresponding to the HARQ-ID to a DL MAC processor based on the retransmit indicator indicates a retransmission;
   providing the control MCS to the DL MAC processor based on the transmit indicator indicates no retransmission; and
   storing the control MCS and the HARQ-ID.

3. The method of claim 1 further comprising:

computing a feedback parameter based on the decode failure indicator, wherein the feedback parameter comprises a BLER (Block Error Rate).

4. The method of claim 3, wherein the computing a feedback parameter based on the decode failure indicator comprises calculating the BLER as a function of a transfer block error detection bit over a plurality of iterations.

5. The method of claim 4, where the calculating the BLER over a plurality of iterations occurs over a moving window.

6. The method of claim 5, wherein the moving window comprises 1000 iterations.

7. The method of claim 4, wherein the decode failure indicator corresponds to a received ACK/NACK (Acknowledgement/Negative Acknowledgement) data.

8. The method of claim 4, where in the decode failure indicator corresponds to a CRC (Cyclic Redundancy Check) failure in processing an uplink transport block.

9. The method of claim 1, wherein the control parameter comprises a CQI (Channel Quality Indicator).

10. The method of claim 9, wherein the baseband processor comprises an LTE (Long Term Evolution) eNodeB.

11. The method of claim 10, wherein the deriving a control MCS comprises:

mapping the updated control parameter to an SE (Spectral Efficiency);

mapping the SE to a TBS (Transport Block Size); and mapping the TBS to the control MCS.

12. The method of claim 9, wherein the baseband processor comprises a 5G gNodeB.

13. The method of claim 12, wherein the deriving a control MCS comprises:

mapping the updated control parameter to an SE; and mapping the SE to the control MCS.

14. The method of claim 1, wherein the control parameter comprises a SINR (Signal to Interference and Noise Ratio).

15. The method of claim 14, wherein the baseband processor comprises an LTE (Long Term Evolution) eNodeB.

16. The method of claim 15, wherein the deriving a control MCS comprises:

calculating a TBS index as a function of of SINR; and mapping the TBS index to the control MCS.

17. The method of claim 14, wherein the baseband processor comprises a 5G gNodeB.

18. The method of claim 17, wherein the deriving a control MCS comprises:

calculating a SE as a function of SINR; and mapping the SE to the control MCS.

19. A baseband processor configured to select a modulation and coding scheme (MCS), baseband processor comprising:

an uplink (UL) physical (PHY) processor configured to receiving a transport block from a UE (User Equipment);

a downlink (DL) link adaptation processor configured to retrieve data from the UL PHY processor and a UL Medium Access Control (MAC) processor, and based on the retrieved data update a HARQ-ID data (Hybrid Acknowledge Request Identification) from the received transport block, the HARQ-ID data including a control parameter related to channel quality, a retransmit indicator, and decode failure indicator;

a DL Proportional, Integral, Differential (PID) controller configured to perform a PID-based computation of a control offset, wherein the control offset corresponds to the control parameter, and wherein the DL adaptation processor is further configured to compute an updated control parameter based on the control parameter and the control offset, and derive a control MCS corresponding to the updated control parameter.

20. The baseband processor of claim 18, wherein the DL PID controller is within DL link adaptation processor.

* * * * *